United States Patent
Thibadeau, Sr. et al.

(10) Patent No.: US 9,866,549 B2
(45) Date of Patent: *Jan. 9, 2018

(54) ANTIALIASING FOR PICTURE PASSWORDS AND OTHER TOUCH DISPLAYS

(71) Applicants: Robert H. Thibadeau, Sr., Pittsburgh, PA (US); Justin D. Donnell, Verona, PA (US); Robert Thibadeau, Jr., Decatur, GA (US)

(72) Inventors: Robert H. Thibadeau, Sr., Pittsburgh, PA (US); Justin D. Donnell, Verona, PA (US); Robert Thibadeau, Jr., Decatur, GA (US)

(73) Assignee: Antique Books, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/295,718

(22) Filed: Oct. 17, 2016

(65) Prior Publication Data

US 2017/0034150 A1 Feb. 2, 2017

Related U.S. Application Data

(63) Continuation of application No. 14/728,904, filed on Jun. 2, 2015, now Pat. No. 9,490,981.

(Continued)

(51) Int. Cl.
*H04L 29/06* (2006.01)
*H04L 9/32* (2006.01)
(Continued)

(52) U.S. Cl.
CPC ........ *H04L 63/083* (2013.01); *G06F 3/04812* (2013.01); *G06F 3/04842* (2013.01);
(Continued)

(58) Field of Classification Search
CPC . H04L 63/083; H04L 63/0861; H04L 9/3242; H04L 63/0853; H04L 9/3239;
(Continued)

(56) References Cited

U.S. PATENT DOCUMENTS 5,559,961 A 9/1996 Blonder
6,209,104 B1 3/2001 Jalili
(Continued)

FOREIGN PATENT DOCUMENTS

EP 1601153 A2 11/2005
EP 2085908 A2 8/2009
(Continued)

OTHER PUBLICATIONS

Non-Final Office Action for U.S. Appl. No. 14/693,121, dated Aug. 6, 2015, 16 pages.
(Continued)

*Primary Examiner* — Mahfuzur Rahman
(74) *Attorney, Agent, or Firm* — Withrow & Terranova, PLLC

(57) ABSTRACT

Antialiasing for picture passwords and other touch displays is disclosed. In some embodiments a client device for authenticating a user is operable to obtain a sequence of input actions for an image and obtain a partial hash from a Proof of Knowledge (PoK) server where the partial hash is part of a hash used for authentication of the user. The client device is also operable to calculate a hash for the sequence and determine if a part of the hash matches the partial hash. If the part of the hash matches the partial hash, the client device sends a communication to the PoK server to authenticate the user based on the hash for the sequence of the one or more input actions and obtain a response indicating
(Continued)

whether the user is authenticated. In this way, sending some hashes to the proof of knowledge server may not be necessary, saving resources.

13 Claims, 8 Drawing Sheets

Related U.S. Application Data

(60) Provisional application No. 62/025,141, filed on Jul. 16, 2014, provisional application No. 62/006,466, filed on Jun. 2, 2014.

(51) Int. Cl.
    *G06F 21/36*     (2013.01)
    *G06F 3/0484*     (2013.01)
    *G06F 3/0481*     (2013.01)

(52) U.S. Cl.
    CPC ............ *G06F 21/36* (2013.01); *H04L 9/3218* (2013.01); *H04L 9/3236* (2013.01); *H04L 9/3239* (2013.01); *H04L 9/3242* (2013.01); *H04L 63/0853* (2013.01); *H04L 63/0861* (2013.01); *H04L 63/0884* (2013.01); *G06F 2221/2133* (2013.01); *H04L 2209/20* (2013.01)

(58) Field of Classification Search
    CPC . H04L 9/3218; H04L 9/3236; H04L 63/0884; H04L 2209/20; G06F 21/36
    USPC ........................................................ 713/155
    See application file for complete search history.

(56) References Cited

U.S. PATENT DOCUMENTS

| | | |
|---|---|---|
| 6,249,868 B1 | 6/2001 | Sherman et al. |
| 6,411,283 B1 | 6/2002 | Murphy |
| 6,658,328 B1 | 12/2003 | Alrabady et al. |
| 6,934,860 B1 | 8/2005 | Goldstein |
| 6,983,065 B1 | 1/2006 | Akgul et al. |
| 7,243,239 B2 | 7/2007 | Kirovski et al. |
| 7,370,351 B1 | 5/2008 | Ramachandran et al. |
| 7,734,930 B2 | 6/2010 | Kirovski et al. |
| 8,015,563 B2 | 9/2011 | Araujo, Jr. et al. |
| 8,024,775 B2 | 9/2011 | Xu et al. |
| 8,155,622 B1 | 4/2012 | Moshenberg et al. |
| 8,191,126 B2 | 5/2012 | Raghavan |
| 8,353,016 B1 | 1/2013 | Pravetz et al. |
| 8,392,975 B1 | 3/2013 | Raghunath |
| 8,627,421 B1 | 1/2014 | Bowers et al. |
| 8,667,560 B2 | 3/2014 | Albisu |
| 8,682,802 B1 | 3/2014 | Kannanari |
| 8,813,183 B2 | 8/2014 | Thibadeau et al. |
| 8,813,247 B1 | 8/2014 | Alten |
| 8,832,804 B1 | 9/2014 | Casey et al. |
| 8,881,251 B1 | 11/2014 | Hilger |
| 8,918,851 B1 | 12/2014 | Iannamico |
| 8,966,268 B2 | 2/2015 | Marien |
| 9,300,659 B2 | 3/2016 | Thibadeau, Sr. et al. |
| 9,323,435 B2 | 4/2016 | Thibadeau, Sr. et al. |
| 2002/0029341 A1 | 3/2002 | Juels et al. |
| 2002/0080123 A1 | 6/2002 | Kennedy et al. |
| 2002/0196274 A1 | 12/2002 | Comfort et al. |
| 2003/0147536 A1 | 8/2003 | Andivahis et al. |
| 2004/0010721 A1 | 1/2004 | Kirovski et al. |
| 2004/0030934 A1 | 2/2004 | Mizoguchi et al. |
| 2004/0034801 A1 | 2/2004 | Jaeger |
| 2004/0073809 A1 | 4/2004 | Wing Keong |
| 2004/0095384 A1 | 5/2004 | Avni et al. |
| 2004/0230843 A1 | 11/2004 | Jansen |
| 2006/0206717 A1 | 9/2006 | Holt et al. |
| 2006/0244735 A1 | 11/2006 | Wilson |
| 2007/0005962 A1 | 1/2007 | Baker |
| 2007/0067631 A1 | 3/2007 | Westhoff |
| 2007/0097096 A1 | 5/2007 | Rosenberg |
| 2007/0150842 A1 | 6/2007 | Chaudhri et al. |
| 2007/0229216 A1 | 10/2007 | Yasuda |
| 2008/0010678 A1 | 1/2008 | Burdette et al. |
| 2008/0022129 A1 | 1/2008 | Durham et al. |
| 2008/0163055 A1 | 7/2008 | Ganz et al. |
| 2008/0201578 A1 | 8/2008 | Drake |
| 2008/0263361 A1 | 10/2008 | Dutta et al. |
| 2009/0089869 A1 | 4/2009 | Varghese |
| 2009/0106134 A1 | 4/2009 | Royyuru |
| 2009/0158424 A1 | 6/2009 | Yang |
| 2009/0160800 A1 | 6/2009 | Liu et al. |
| 2009/0199002 A1 | 8/2009 | Erickson |
| 2009/0202153 A1 | 8/2009 | Cortopassi et al. |
| 2009/0313693 A1 | 12/2009 | Rogers |
| 2010/0043062 A1 | 2/2010 | Alexander et al. |
| 2010/0146128 A1 | 6/2010 | Kulkarni et al. |
| 2010/0169958 A1 | 7/2010 | Werner et al. |
| 2010/0207721 A1 | 8/2010 | Nakajima et al. |
| 2010/0223326 A1 | 9/2010 | Noldus et al. |
| 2011/0013031 A1 | 1/2011 | Miyasako |
| 2011/0055585 A1 | 3/2011 | Lee |
| 2011/0081640 A1 | 4/2011 | Tseng et al. |
| 2011/0099203 A1 | 4/2011 | Fastring |
| 2011/0162067 A1 | 6/2011 | Shuart et al. |
| 2011/0191592 A1 | 8/2011 | Goertzen |
| 2011/0197259 A1 | 8/2011 | Thibadeau et al. |
| 2011/0202982 A1 | 8/2011 | Alexander et al. |
| 2012/0005483 A1 | 1/2012 | Patvarczki et al. |
| 2012/0011564 A1 | 1/2012 | Osborn et al. |
| 2012/0054833 A1 | 3/2012 | Albisu |
| 2012/0084869 A1 | 4/2012 | Bilaney et al. |
| 2012/0167199 A1 | 6/2012 | Riddiford |
| 2012/0175412 A1 | 7/2012 | Grabiner et al. |
| 2012/0304284 A1 | 11/2012 | Johnson et al. |
| 2013/0031623 A1 | 1/2013 | Sanders |
| 2013/0042303 A1 | 2/2013 | Chow et al. |
| 2013/0043914 A1 | 2/2013 | Gelman |
| 2013/0047236 A1 | 2/2013 | Singh |
| 2013/0097697 A1 | 4/2013 | Zhu et al. |
| 2013/0104197 A1 | 4/2013 | Nandakumar |
| 2013/0111581 A1 | 5/2013 | Griffin et al. |
| 2013/0179954 A1 | 7/2013 | Bidare |
| 2013/0201106 A1 | 8/2013 | Naccache |
| 2013/0268775 A1 | 10/2013 | Hawkins |
| 2013/0340057 A1 | 12/2013 | Kitlyar |
| 2014/0006512 A1 | 1/2014 | Huang et al. |
| 2014/0023279 A1 | 1/2014 | Fahn et al. |
| 2014/0028554 A1 | 1/2014 | De Los Reyes et al. |
| 2014/0181956 A1 | 6/2014 | Ahn et al. |
| 2014/0201831 A1 | 7/2014 | Yi et al. |
| 2014/0233740 A1 | 8/2014 | Niamut et al. |
| 2014/0282961 A1 | 9/2014 | Dorfman et al. |
| 2014/0320420 A1 | 10/2014 | Ida et al. |
| 2014/0331057 A1 | 11/2014 | Thibadeau et al. |
| 2014/0359653 A1 | 12/2014 | Thorpe et al. |
| 2014/0373132 A1 | 12/2014 | Basmov et al. |
| 2015/0033306 A1 | 1/2015 | Dickenson et al. |
| 2015/0138584 A1 | 5/2015 | Tsongas et al. |
| 2015/0180902 A1 | 6/2015 | Biswas et al. |
| 2015/0301724 A1 | 10/2015 | Thibadeau, Sr. et al. |
| 2015/0304303 A1 | 10/2015 | Thibadeau, Sr. et al. |
| 2015/0310188 A1 | 10/2015 | Ford et al. |
| 2015/0349957 A1 | 12/2015 | Thibadeau, Sr. et al. |
| 2015/0350210 A1 | 12/2015 | Thibadeau, Sr. et al. |
| 2016/0044021 A1 | 2/2016 | Thibadeau, Sr. et al. |
| 2016/0050198 A1 | 2/2016 | Thibadeau, Sr. et al. |
| 2016/0195995 A1 | 7/2016 | Thibadeau, Sr. et al. |

FOREIGN PATENT DOCUMENTS

| | | |
|---|---|---|
| EP | 2775416 A2 | 9/2014 |
| GB | 2504746 A | 2/2014 |
| RU | 2013113592 A | 10/2014 |
| WO | 03048909 A2 | 6/2003 |
| WO | 2009039223 A1 | 3/2009 |
| WO | 2011014878 A1 | 2/2011 |

(56) References Cited

FOREIGN PATENT DOCUMENTS

| WO | 2011100017 A1 | 8/2011 |
|---|---|---|
| WO | 2013003535 A1 | 1/2013 |
| WO | 2014165431 A1 | 10/2014 |

OTHER PUBLICATIONS

Non-Final Office Action for U.S. Appl. No. 14/728,902, dated Aug. 26, 2015, 15 pages.
Invitation to Pay Additional Fees and Partial International Search Report for PCT/US2015/033823, dated Aug. 14, 2015, 7 pages.
International Search Report and Written Opinion for PCT/US2015/033830, dated Aug. 24, 2015, 11 pages.
Non-Final Office Action for U.S. Appl. No. 14/330,986, dated Sep. 15, 2015, 16 pages.
Non-Final Office Action for U.S. Appl. No. 14/728,759, dated Sep. 10, 2015, 15 pages.
International Search Report and Written Opinion for PCT/US2015/033811, dated Sep. 21, 2015, 10 pages.
International Search Report and Written Opinion for PCT/US2015/044694, dated Oct. 2, 2015, 10 pages.
Author Unknown, "Cognitive test," Wikipedia.com, last modified Oct. 28, 2014, retrieved on Nov. 11, 2015, 3 pages, https://en.wikipedia.org/w/index.php?title=Cognitive_test&oldid=631463869.
Author Unknown, "James McKeen Cattell," Wikipedia.com, last modified Sep. 9, 2015, retrieved on Nov. 11, 2015, 5 pages, https://en.wikipedia.org/wiki/James_McKeen_Cattell.
International Search Report and Written Opinion for PCT/US2015/027040, dated Nov. 20, 2015, 21 pages.
International Search Report and Written Opinion for PCT/US2015/033823, dated Dec. 2, 2015, 18 pages.
Final Office Action for U.S. Appl. No. 14/330,986, dated Feb. 4, 2016, 18 pages.
Advisory Action for U.S. Appl. No. 14/330,986, dated May 2, 2016, 3 pages.
Notice of Allowance for U.S. Appl. No. 14/693,121, dated Jan. 22, 2016, 7 pages.
Final Office Action for U.S. Appl. No. 14/728,902, dated Jan. 29, 2016, 6 pages.
Notice of Allowance for U.S. Appl. No. 14/728,902, dated Mar. 11, 2016, 7 pages.
Non-Final Office Action for U.S. Appl. No. 14/728,904, dated Jan. 25, 2016, 15 pages.
Final Office Action for U.S. Appl. No. 14/728,759, dated Feb. 1, 2016, 17 pages.
Non-Final Office Action for U.S. Appl. No. 14/823,739, dated Nov. 30, 2015, 17 pages.
Final Office Action for U.S. Appl. No. 14/823,739, dated Apr. 28, 2016, 10 pages.
Menezes, A. et al., "Identification and Entity Authentication," Handbook of Applied Cryptography, CRC Press, 1997, pp. 385-424.
International Preliminary Report on Patentability for PCT/US2015/027040, dated Nov. 3, 2016, 15 pages.
International Preliminary Report on Patentability for PCT/US2015/033823, dated Nov. 3, 2016, 12 pages.
International Search Report and Written Opinion for PCT/US2016/020670, dated May 12, 2016, 11 pages.
International Search Report and Written Opinion for PCT/US2016/033793, dated Jul. 22, 2016, 11 pages.
Examination Report for European Patent Application No. 10845949.6, dated Jun. 13, 2016, 6 pages.
Examiner's Answer to the Appeal Brief for U.S. Appl. No. 14/330,986, dated Dec. 7, 2016, 21 pages.
Non-Final Office Action for U.S. Appl. No. 15/069,635, dated Jun. 16, 2016, 6 pages.
Notice of Allowance for U.S. Appl. No. 15/069,635, dated Oct. 18, 2016, 7 pages.
Notice of Allowance for U.S. Appl. No. 14/728,904, dated Jul. 1, 2016, 12 pages.
Corrected Notice of Allowability for U.S. Appl. No. 14/728,904, dated Aug. 10, 2016, 9 pages.
Corrected Notice of Allowability for U.S. Appl. No. 14/728,904, dated Oct. 13, 2016, 9 pages.
Non-Final Office Action for U.S. Appl. No. 14/728,759, dated Jul. 26, 2016, 16 pages.
Notice of Allowance for U.S. Appl. No. 14/823,739, dated Jul. 12, 2016, 8 pages.
International Preliminary Report on Patentability for PCT/US2015/033830, dated Dec. 15, 2016, 8 pages.
International Preliminary Report on Patentability for PCT/US2015/033811, dated Dec. 15, 2016, 7 pages.
Author Unknown, "Human Verification," retrieved on Apr. 22, 2015 from graphicdesign.stackexchange.com, 1 page.
Author Unknown, "OpenID Authentication 2.0—Final," Openid.net, Dec. 5, 2007, retrieved on Jan. 1, 2013 from http://openid.net/specs/openid-authentication-2_0.html#http_encoding, 34 pages.
Author Unknown, "Security Assertion Markup Language (SAML) V2.0 Technical Overview," OASIS, Mar. 25, 2008, retrieved on Apr. 14, 2010 from http://docs.oasis-open.org/security/saml/Post2.0/sstc-saml-tech-overview-2.0-cd-02.pdf, 51 pages.
Beideman, Calvin et al., "Set Families with Low Pairwise Intersection," Apr. 17, 2014, retrieved Jan. 15, 2015 from http://www.cs.cmu.edu/~jblocki/, 12 pages.
Blocki, Jeremiah et al., "Adaptive Regret Minimization in Bounded-Memory Games," Decision and Game Theory for Security: Proceedings of the 4th International Conference on Decision and Game Theory for Security (GameSec), Nov. 11-12, 2013, Fort Worth, TX, Springer International Publishing, pp. 65-84, retrieved Jan. 15, 2015 from http://www.cs.cmu.edu/~jblocki/, 19 pages.
Blocki, Jeremiah et al., "Adaptive Regret Minimization in Bounded-Memory Games," Presentation Slides, retrieved Jan. 15, 2015 from http://www.cs.cmu.edu/~jblocki/, 61 pages.
Blocki, Jeremiah et al., "Audit Games," Proceedings of the 23rd International Joint Conference on Artificial Intelligence, Aug. 3-9, 2013, Beijing, China, AAAI Press, pp. 41-47.
Blocki, Jeremiah et al., "Audit Games with Multiple Defender Resources," retrieved Jan. 15, 2015 from http://www.cs.cmu.edu/~jblocki/, 11 pages.
Blocki, Jeremiah et al., "Audit Mechanisms for Provable Risk Management and Accountable Data Governance," Decision and Game Theory for Security: Proceedings of the 3rd International Conference on Decision and Game Theory for Security (GameSec), Budapest, Hungary, Nov. 5-6, 2012, Springer Berlin Heidelberg, pp. 38-59, retrieved Jan. 15, 2015 from http://www.cs.cmu.edu/~jblocki/, 27 pages.
Blocki, Jeremiah et al., "Audit Mechanisms for Privacy Protection in Healthcare Environments," Proceedings of the 2nd USENIX Conference on Health Security and Privacy (HealthSec'11), Aug. 8-12, 2011, San Francisco, CA, USENIX Association, p. 10, retrieved Jan. 15, 2015 from http://www.cs.cmu.edu/~jblocki/, 2 pages.
Blocki, Jeremiah et al., "Differentially Private Data Analysis of Social Networks via Restricted Sensitivity," Proceedings of the 4th Conference on Innovations in Theoretical Computer Science (ITCS '13), Jan. 10-12, 2013, Berkely, CA, ACM, pp. 87-96, retrieved Jan. 15, 2015 from http://arxiv.org/abs/1208.4586v2, 19 pages.
Blocki, Jeremiah et al., "Differentially Private Data Analysis of Social Networks via Restricted Sensitivity," Presentation Slides, Fall 2012, retrieved Jan. 15, 2015 from http://www.cs.cmu.edu/~jblocki/, 94 pages.
Blocki, Jeremiah, "Senior Research Thesis: Direct Zero-Knowledge Proofs," May 1, 2009, retrieved Jan. 15, 2015 from http://www.cs.cmu.edu/~jblocki/, 16 pages.
Blocki, Jeremiah et al., "GOTCHA Password Hackers!" Proceedings of the 2013 ACM Workshop on Artificial Intelligence and Security (AISec '13), Nov. 4-8, 2013, Berlin, Germany, ACM, 12 pages.
Blocki, Jeremiah et al., "GOTCHA Password Hackers!" Presentation Slides, retrieved Jan. 15, 2015 from http://www.cs.cmu.edu/~jblocki/, 38 pages.

(56) References Cited

OTHER PUBLICATIONS

Blocki, Jeremiah et al., "Human Computable Passwords," Oct. 2, 2014, retrieved Jan. 15, 2015 from http://www.cs.cmu.edu/~jblocki/, 43 pages.

Blocki, Jeremiah et al., "Human Computable Passwords," Presentation Slides, Fall 2014, retrieved Jan. 15, 2015 from http://www.cs.cmu.edu/~jblocki/, 111 pages.

Blocki, Jeremiah et al., "The Johnson-Lindenstrauss Transform Itself Preserves Differential Privacy," Proceedings of the 2012 IEEE 53rd Annual Symposium on Foundations of Computer Science (FOCS), Oct. 20-23, 2012, New Brunswick, NJ, IEEE Computer Society, pp. 410-419, retrieved Jan. 15, 2015 from http://www.cs.cmu.edu/~jblocki/, 27 pages.

Blocki, Jeremiah et al., "Naturally Rehearsing Passwords," Advances in Cryptology—ASIACRYPT 2013: Proceedings of the 19th International Conference on the Theory and Application of Cryptology and Information Security, Part II, Bengalaru, India, Dec. 1-5, 2013 Springer Berlin Heidelberg, pp. 361-380, retrieved Jan. 15, 2015 from http://www.cs.cmu.edu/~jblocki/, 34 pages.

Blocki, Jeremiah et al., "Optimizing Password Composition Policies," Proceedings of the 14th ACM Conference on Electronic Commerce, Jun. 16-20, 2013, Philadelphia, PA, ACM, pp. 105-122, retrieved Jan. 15, 2015 from http://www.cs.cmu.edu/~jblocki/, 27 pages.

Blocki, Jeremiah, "Usable and Secure Password Management," Presentation Slides, Spring 2012, retrieved Jan. 15, 2015 from http://www.cs.cmu.edu/~jblocki/, 75 pages.

Blocki, Jeremiah et al., "Regret Minimizing Audits: A Learning-theoretic Basis for Privacy Protection," 2011 IEEE 24th Computer Security Foundations Symposium (CSF), Jun. 27-29, 2011, Cernay-la-Ville, France, IEEE, pp. 312-327, retrieved Jan. 15, 2015 from http://www.cs.cmu.edu/~jblocki/, 16 pages.

Blocki, Jeremiah et al., "Resolving the Complexity of Some Data Privacy Problems," Automata, Languages and Programming: Proceedings of the 37th International Colloquium Conference on Automata, Languages and Programming (ICALP 2010), Jul. 6-10, 2010, Bordeaux, France, Springer Berlin Heidelberg, pp. 393-404, retrieved Jan. 15, 2015 from http://www.cs.cmu.edu/~jblocki/, 18 pages.

Blocki, Jeremiah et al., "Resolving the Complexity of Some Data Privacy Problems," Presentation Slides, 2010, retrieved Jan. 15, 2015 from http://www.cs.cmu.edu/~jblocki/, 36 pages.

Blocki, Jeremiah et al., "Spaced Repetition and Mnemonics Enable Recall of Multiple Strong Passwords," Oct. 6, 2014, retrieved Jan. 15, 2015 from http://www.cs.cmu.edu/~jblocki/, 16 pages.

Blocki, Jeremiah, "Usable Human Authentication: A Quantitative Treatment," Doctoral Thesis, Jun. 30, 2014, retrieved Jan. 15, 2015 from http://www.cs.cmu.edu/~jblocki/, 262 pages.

Dunphy, Paul et al., "Do Background Images Improve "Draw a Secret" Graphical Passwords?" Proceedings of the 14th ACM Conference on Computer and Communications Security (CCS '07), Oct. 29-Nov. 2, 2007, Alexandria, Virginia, ACM, pp. 36-47.

Hughes, Neil, "Future iPhones, iPads could recognize, adjust for individual users," AppleInsider, Aug. 19, 2010, 4 pages, http://appleinsider.com/articles/10/08/19/future_iphones_ipads_could_recognize_adjust_for_individual_users.

Jansen, Wayne et al., "Picture Password: A Visual Login Technique for Mobile Devices," National Institute of Standards and Technology, NISTIR 7030, Jul. 2003, 20 pages.

Pace, Zach, "Signing in with a picture password," http://blogs.msdn.com/b/b8/archive/2011/12/16/signing-in-with-a-picture-password.aspx, Dec. 16, 2011, 9 pages.

Scavo, T. et al., "Shibboleth Architecture," Jun. 8, 2005, retrieved on Jun. 20, 2014 from http:/open-systems.ufl.edu/files/draft-mace-shibboleth-tech-overview-latest.pdf, 31 pages.

Thibadeau, Robert et al., "Proofs of Knowledge on the Web: A New Framework for Password Identification and Capacity to Make Decisions," 2014-NIST-NSTIC-01 Abbreviated Proposal, Bright Plaza, Inc., Philadelphia, Mar. 2, 2014, 5 pages.

Zhao, Ziming et al., "On the Security of Picture Gesture Authentication," 22nd USENIX Security Symposium, Aug. 14-16, 2013, Washington, D.C., pp. 383-398.

International Search Report for PCT/US10/58825, dated Feb. 2, 2011, 2 pages.

Written Opinion of the International Searching Authority for PCT/US10/58825, dated Feb. 2, 2011, 4 pages.

International Preliminary Report on Patentability for PCT/US10/58825, dated May 23, 2012, 3 pages.

International Search Report and Written Opinion for PCT/US2014/032342, dated Jul. 4, 2014, 14 pages.

Written Opinion of the International Searching Authority for PCT/US2014/032342, dated Mar. 17, 2015, 6 pages.

International Preliminary Report on Patentability for PCT/US2014/032342, dated Jun. 24, 2015, 23 pages.

Extended European Search Report for European Patent Application No. 10845949.6, dated Oct. 9, 2014, 7 pages.

Non-Final Office Action for U.S. Appl. No. 12/884,478, dated Dec. 12, 2012, 15 pages.

Final Office Action for U.S. Appl. No. 12/884,478, dated May 20, 2013, 19 pages.

Advisory Action for U.S. Appl. No. 12/884,478, dated Sep. 9, 2013, 3 pages.

Notice of Allowance and Examiner-Initiated Interview Summary for U.S. Appl. No. 12/884,478, dated Apr. 4, 2014, 10 pages.

Non-Final Office Action for U.S. Appl. No. 14/330,986, dated Dec. 16, 2014, 18 pages.

Final Office Action for U.S. Appl. No. 14/330,986, dated Apr. 27, 2015, 20 pages.

Advisory Action and Examiner Initiated Interview for U.S. Appl. No. 14/330,986, dated Jul. 14, 2015, 3 pages.

Invitation to Pay Additional Fees and Partial International Search Report for PCT/US2015/027040, dated Jul. 24, 2015, 7 pages.

Non-Final Office Action for U.S. Appl. No. 14/782,257, dated Mar. 9, 2017, 6 pages.

Final Office Action for U.S. Appl. No. 14/728,759, dated Feb. 15, 2017, 18 pages.

Second Written Opinion for PCT/US2016/033793, dated Apr. 4, 2017, 5 pages.

Non-Final Office Action for U.S. Appl. No. 15/409,045, dated Apr. 19, 2017, 8 pages.

Non-Final Office Action for U.S. Appl. No. 15/295,701, dated Apr. 28, 2017, 6 pages.

International Preliminary Report on Patentability for PCT/US2015/044694, dated Feb. 23, 2017, 8 pages.

Notice of Allowance for U.S. Appl. No. 15/409,045, dated Nov. 1, 2017, 7 pages.

Notice of Allowance for U.S. Appl. No. 15/295,701, dated Sep. 25, 2017, 7 pages.

International Preliminary Report on Patentability for PCT/US2016/020670, dated Sep. 14, 2017, 7 pages.

International Preliminary Report on Patentability for PCT/US2016/033793, dated Jun. 27, 2017, 6 pages.

Non-Final Office Action for U.S. Appl. No. 14/728,759, dated Aug. 3, 2017, 19 pages.

ANTIALIASING FOR PICTURE PASSWORDS AND OTHER TOUCH DISPLAYS

RELATED APPLICATIONS

This application is a continuation of U.S. patent application Ser. No. 14/928,904, which claims the benefit of provisional patent application Ser. No. 62/006,466, filed Jun. 2, 2014 and provisional patent application Ser. No. 62/025,141, filed Jul. 16, 2014, the disclosures of which are hereby incorporated herein by reference in their entireties.

FIELD OF THE DISCLOSURE

The present disclosure relates generally to proofs of knowledge.

BACKGROUND

Authentication mechanisms use one or more authentication factors to control access to secured services or devices. An authentication mechanism may require a knowledge factor (e.g., a username and a password), an ownership factor (e.g., a hardware security token), an inherence factor (e.g., a biometric identifier such as a fingerprint), or combinations thereof. The first of these is commonly referred to as proof of knowledge.

Authentication based on proof of knowledge includes a provisioning phase (e.g., enrollment) to define user knowledge, and a use phase to authenticate a user that proves that knowledge. Authentication based on conventional identity management techniques provides access control to secured services by validating a username and password to demonstrate proof of knowledge. Improved identity management techniques to authenticate a user employ picture passwords (rather than conventional textual passwords) that prove that the user has knowledge of a combination of input actions together with a known image such as a still picture, a motion picture with or without sound, a photograph, or the like.

Determining if a user should be authenticated using a picture password may be difficult in some situations or may be computationally intensive. As such, improved authentication methods are needed.

SUMMARY

Systems and methods for antialiasing for picture passwords and other touch displays are disclosed. In some embodiments a client device for authenticating a user includes one or more processors and memory. The memory contains instructions executable by the one or more processors whereby the client device is operable to obtain a sequence of one or more input actions for an image displayed at the client device and obtain a partial hash from a proof of knowledge server where the partial hash is part of a hash used for authentication of the user. The client device is also operable to calculate a hash for the sequence of the one or more input actions and determine if a part of the hash matches the partial hash. In response to determining that the part of the hash matches the partial hash, the client device is operable to send a communication to a proof of knowledge server to authenticate the user based on the hash for the sequence of the one or more input actions and obtain a response from the proof of knowledge server indicating whether the user is authenticated based on the hash for the sequence of the one or more input actions. In this way, sending some hashes to the proof of knowledge server may not be necessary, therefore saving resources.

In some embodiments, the hash for the sequence of the one or more input actions is a hash of one of a plurality of possible sequences based on the sequence of the one or more input actions.

In some embodiments, the client device is also operable to calculate a hash of another of the plurality of possible sequences and determine if a part of the hash matches the partial hash. In response to determining that the part of the hash matches the partial hash, the client device is operable to send a communication to the proof of knowledge server to authenticate the user based on the hash of another of the plurality of possible sequences and obtain a response from the proof of knowledge server indicating whether the user is authenticated based on the hash of another of the plurality of possible sequences.

In some embodiments, the client device is also operable to, for each possible sequence in the plurality of possible sequences, perform the calculate, determine, send, and obtain steps for that possible sequence.

In some embodiments, being operable to obtain the one or more input actions comprises being operable to tile the image with an implicit grid comprising a plurality of grid elements and obtain the one or more input actions according to the implicit grid.

In some embodiments, the client device is also operable to, for each input action of the one or more input actions, determine one or more possible input actions and determine the plurality of possible sequences as the combination of one of the one or more possible input actions for each input action of the one or more input actions. In some embodiments, being operable to determine one or more possible input actions for an input action comprises being operable to determine the one or more possible input actions for the input action as the neighboring points of the input action. In some embodiments, the neighboring points of the input action are neighboring points of the input action on the implicit grid. In some embodiments, the implicit grid is hexagonal and each input action has six neighboring points comprising the vertices of a hexagon on the implicit grid centered at the input action.

In some embodiments, original hash is n bits, the partial hash is k bits of the original hash, and k is less than n. In some embodiments, the partial hash is the first k bits of the original hash.

In some embodiments, the client device is also operable to, in response to obtaining the response indicating that the user is authenticated, permit access to the user.

In some embodiments, a proof of knowledge server includes one or more processors and memory. The memory contains instructions executable by the one or more processors whereby the server computer is operable to send a communication to a client device containing a partial hash where the partial hash is a value derived from an original hash of one or more original input actions used to authenticate a user; receive a communication from a client device containing a hash of one or more input actions; and authenticate the user at the client device based on the hash received from the client device and the original hash of the one or more original input actions.

In some embodiments, being operable to authenticate the user at the client device includes being operable to determine if the hash received from the client device and the original hash of the one or more original input actions are the same. If the hash received from the client device and the original hash are the same, the proof of knowledge server is operable to send a communication to the client device indicating that the user at the client device is authenticated. If the hash received from the client device and the original hash are not the same, the proof of knowledge server is operable to send a communication to the client device indicating that the user at the client device is not authenticated.

In some embodiments, the original hash is n bits, the partial hash is k bits of the original hash, and k is less than n. In some embodiments, the partial hash is the first k bits of the original hash.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
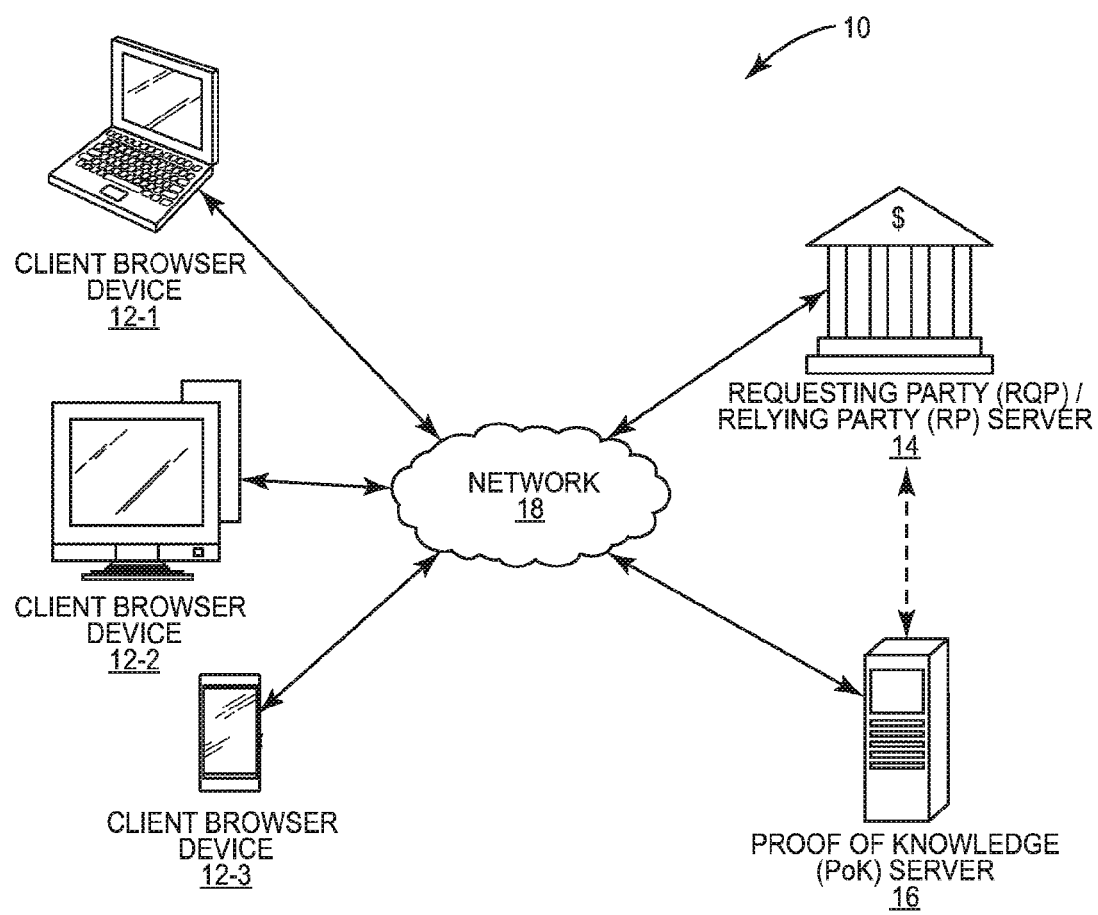
FIG. 1 illustrates a proof of knowledge authentication system according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts and applications fall within the scope of the disclosure and the accompanying claims.

The purpose of terminology used herein is only for describing embodiments and is not intended to limit the disclosure.

As used herein, terms such as "first," "second," "third," and the like distinguish one element or embodiment from another but should not limit the element or embodiment. For example, an embodiment can be termed a first embodiment or a second embodiment without departing from the scope of the present disclosure.

As used herein, the term "client device" refers to a device or apparatus that includes hardware and/or software that provides a web browser, a client application operable to communicate using client-server architecture, and/or a client application for retrieving, presenting, and communicating information over the Internet.

As used herein, the term "Relying Party (RP) server" refers to a device or apparatus that provides one or more services accessible by a client device via a network portal (e.g., website). The services may include actions and/or information administered by a RP server in accordance with access controls that require authentication of an identity of a user operating the client device.

As used herein, the term "Proof of Knowledge (PoK) server" refers to a device or apparatus that includes hardware and/or software to provide a service (e.g., a password service) used to authenticate the identity of a user on behalf of the RP server, where the user is operating a client device.

As used herein, the term "Requesting Party" (RQP) refers to a party that requests a proof of knowledge service from the PoK server. As such, the RP server may also be referred to as a RQP server.

As used herein, the term "AJAX" refers to Asynchronous JAVASCRIPT and XML, any suitable communication technique used to send and receive data over the Internet from a server, comparable technologies that allow web applications to send data to and retrieve data from a server asynchronously (in the background) without interfering with the display and behavior of the existing page, or any suitable communication technique as understood by persons skilled in the art.

As used herein, the term "picture password" refers to using one or more known input actions associated with a known image (e.g., without limitation, a still picture; a motion picture with or without sound; a photograph) to provide a password for access to secured information, and/or includes any suitable system or method for a proof of knowledge about an image that a user can readily remember.

As used herein, the term "hash" refers to a cryptographic salted hash, a cryptographic salted hash function (e.g., National Institute of Standards and Technology (NIST) approved SHA256 Password Based Key Derivation Function (PBKDF)), and/or a derivation of enciphered or encoded data used to authenticate the integrity of corresponding information or actions with well-known anti-dictionary attack protections afforded by cryptographic salting. A hash may also include a number of hash iterations as suggested by NIST approved PBKDF.

FIG. 1 illustrates a proof of knowledge authentication system 10 according to some embodiments of the present disclosure. The proof of knowledge authentication system 10 may be formed from a combination of one or more servers and/or one or more client devices. As shown, the proof of knowledge authentication system 10 includes client devices 12-1, 12-2, and 12-3 (generally referred to herein collectively as client device 12 and individually as client device 12), a Requesting Party (RQP)/Relying Party (RP) server 14 (hereafter referred to as the RP server 14), and a Proof of Knowledge (PoK) server 16, all interconnected via a network 18 (e.g., the Internet). In this example, the client devices 12 include a laptop computer 12-1, a desktop computer 12-2, and a mobile device 12-3. However, these are only examples. The client devices 12 can be any suitable type of device that can be used by a user to access the RP server 14.

In some embodiments, the RP server 14 and/or the PoK server 16 can be components of respective services that include one or more web servers that are remote from the client devices 12-1, 12-2, and 12-3. Optionally, the RP server 14 and the PoK server 16 may communicate over a channel separate from the network 18. For example, the client devices 12 may communicate with the servers 14 and 16 over the Internet, but the servers 14 and 16 may communicate with each other over a separate and secured network.

The PoK server 16 may operate to authenticate users of the client devices 12-1, 12-2, and 12-3 over the network 18 on behalf of the RP server 14. The PoK server 16 may also operate to test users of client devices 12-1, 12-2, and 12-3 over the network 18 on behalf of the RP server 14, as described in provisional patent application Ser. No. 62/006,472, filed Jun. 2, 2014, which is incorporated herein by reference in its entirety.

The RP server 14 provides a network portal over the network 18 to display an interface at the client device 12. For example, the network portal may include a website and the network 18 may include the Internet. The RP server 14 administers secured services (e.g., secured private information) that can be accessed via the website by a user operating the client device 12. For example, the RP server 14 may correspond to a server of a financial institution that administers a website for users to access account information over the Internet. However, this is only a particular example, and the disclosed embodiments should not be limited thereto. For example, other institutions that may benefit from the use of the proof of knowledge authentication system 10 include healthcare institutions that administer private patient information via patient portals or the like.

The client device 12 can access the secured services administered by the RP server 14 via the website by providing information used to authenticate the user. For example, a user may input a username and password to login to a banking website. The username may be validated by the RP server 14, and the password may be validated by the PoK server 16 (on behalf of the RP server 14) to authenticate the user. This validation may provide access to the user's secured information. As such, a user can access secured information by demonstrating proof of knowledge of a username and password.

The PoK server 16 operates to authenticate users on behalf of the RP server 14. For example, the client device 12 can communicate directly with the RP server 14 to seek access to private information via a login page of a website administered by the RP server 14. The RP server 14 requests a picture password service from the PoK server 16 to authenticate the user on behalf of the RP server 14. The PoK server 16 redirects the client device 12 to the PoK server 16 and invokes an interface at the client device 12, which is used to authenticate the picture password by the PoK server 16 on behalf of the RP server 14.

This mechanism isolates the source of secured services (e.g., the private information) at the RP server 14 from the authentication mechanism at the PoK server 16, which improves security by separating mechanisms that administer services and information from mechanisms that administer proofs of knowledge. As such, the RP server 14 knows the identity of a user and uses an identifier for that user to request an authentication for the user by using the picture password from the PoK server 16 for that user. The PoK server 16 knows the picture password, including the image for the picture password and a hash of the correct input actions used as proof of the user's knowledge. However, the RP server 14 does not know the picture password, and the PoK server 16 does not know the user's identity (e.g., the user remains anonymous to the PoK server 16).

Some embodiments of the proof of knowledge authentication system 10 involve the use of picture password that prove that the user has knowledge of a combination of input actions together with a known image such as a still picture, a motion picture with or without sound, a photograph, or the like. And in some embodiments using a picture password, the image for the picture password is tiled with an implicit grid such that a selection of a point or some other input action is determined to be one of these grid points. Sometimes a user who knows the correct picture password proof of knowledge may still select the incorrect points because of the precision of the grid points or because of the imprecision of the selecting mechanism. In these situations and in other embodiments, it may be desirable to allow error in touch placement over the grid. In one example with a square grid, the actual touch point is recorded as the center of a 3×3 square of possible touch points. Thus, when an attempt is made to redo the touch point, as with a picture password, the system can search among the nine possible grid locations to see if the actual touch point is nearby. This falls under the category of "anti-aliasing" techniques.

While these "anti-aliasing" techniques allow for increased usability of the system for the user in the form of greater error tolerance on the input actions, the techniques can quickly add complexity in terms of validating the picture password, just because a greater number of grid locations must be checked. This complexity increases further when the information being validated must be kept secret using, for example, a hash of the touch points. Complexity is also increased depending on the nature of the picture password, i.e. there is an exponential explosion of searches if the picture password involves several touches and strokes, particularly of different types as illustrated in International Application No. PCT/US10/058825 entitled "Method and System for Processor or Web Logon." In the case of a web based picture password, the communication, as disclosed in International Application No. PCT/US14/32342 entitled "Method and System of Providing a Picture Password Proof of Knowledge as a Web Service," is a target hash value from the server to the client, and the client must generate and submit for verification all possible hashes. Also, under anti-aliasing techniques, the entropy of the picture password is reduced by the fact that the grid size (vocabulary of the picture password) is reduced (approximately a factor of nine in the case of a square grid).

As such, a broader collection of anti-aliasing techniques and systems and methods for mitigating some of the adverse effects of anti-aliasing techniques are desired. In the present disclosure, the broader collection can be employed together or individually or in any combination to achieve improved anti-aliasing while not impacting performance, even for the positioning that may need to be checked under the above conditions using action-sequence hashes that exponentially explode in number. One technique suitable for reducing the size of the exponential explosion on square grids is to employ a hexagonal grid where the neighborhood is always seven (the center and six surrounds) instead of nine neighbor points for a square grid. This will decrease the number of possible sequences of input actions that must be hashed by the client device 12 and submitted to the PoK server 16 for verification.

However, even with a decreased neighborhood size, there are still an exponential number of hashes that must be submitted for verification. Depending on the implementation of the proof of knowledge authentication system 10, these hash submissions may add significant time to the authentication procedure and/or require significant network resources and processing time at the PoK server 16. One way of addressing this problem is presented in FIG. 2 which is a flow chart that illustrates the operation of a client device 12 in the proof of knowledge authentication system 10 during authentication of a user using a partial hash according to some embodiments of the present disclosure. It would be desirable for the client device 12 to be able to determine if a hash is incorrect and therefore not send the hash to the PoK server 16. This would reduce the network resource consumption and decrease the processing time at the PoK server 16. But, it would be considered a security violation for the server to give the client a complete copy of the hash of action-sequences it is looking for. This is because a malicious man-in-the-middle or client-robot could then perform a semi-exhaustive search over all the possible action-sequences to determine the actions or password desired for authentication or other replay or directive.

Instead of providing the entire copy of the hash, only part of the desired hash is provided to the client device 12. For example, if the hash includes N bits, then the partial hash will include only k bits where k is less than N and preferably much less than N. For example, a partial hash may include only 16 bits of the actual hash that may be 256 bits. The client device 12 can then reject possible hashes of actions without having to transmit all possible hashes to the PoK server 16 for full checking which would load both the network and the server with inefficient activity. The value of k can be determined, and the position of those k bits in the hash can be determined. The position of those k bits is usually not relevant because of the nature of most hash functions to distribute the information content of the input approximately evenly across all bits of the resulting hash. But the number of bits, k, is relevant to the possibility of clashes which can be reduced by increasing k. This results in a tradeoff where a larger value of k means that the client device 12 will be able to eliminate from consideration a larger subset of hashes. But, as the value of k increases, the security implications also increase as an attacker will be able to reduce the number of possible hashes that need to be searched.

Figure 2:
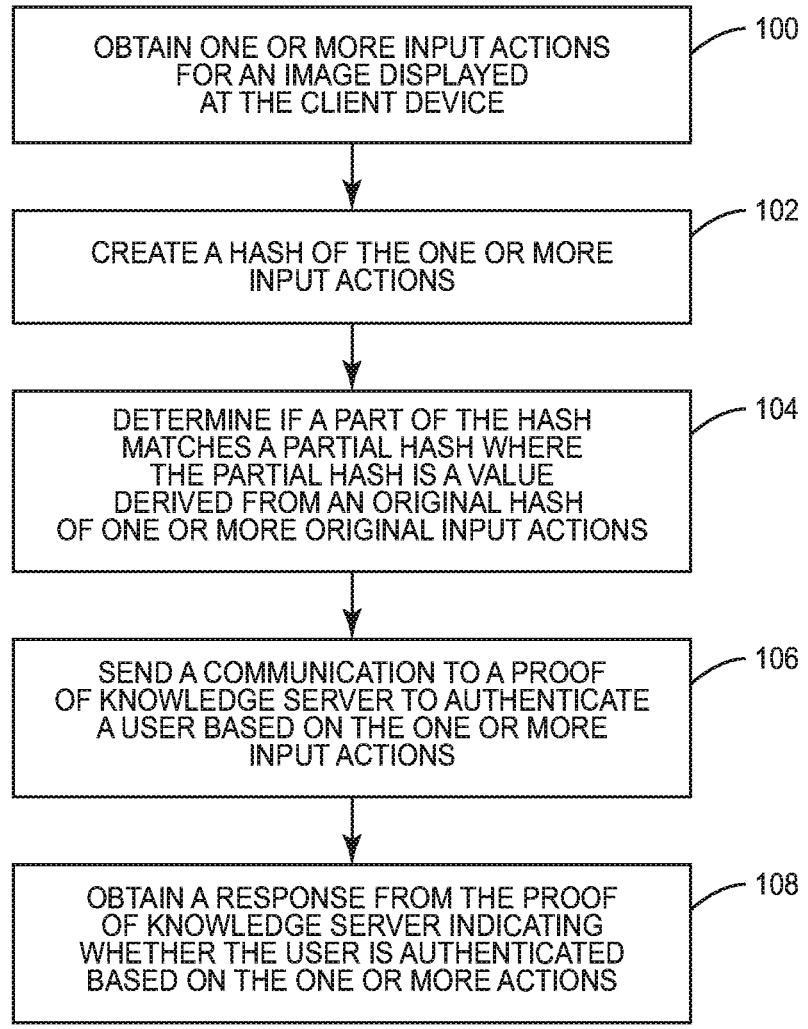
FIG. 2 is a flow chart that illustrates the operation of a client device in the proof of knowledge authentication system during authentication of a user using a partial hash according to some embodiments of the present disclosure.

This technique of using a partial hash can also be used without using a neighborhood of possible points such that a client device 12 may determine in some instances that a hash will not match the desired hash. This is shown in FIG. 2 where a client device 12 obtains one or more input actions for an image displayed at the client device 12 (step 100). As used herein the term "input" refers to data provided by an input device (e.g., a mouse, a touchpad, or a touch-sensitive display) to an electronic device. Inputs may generally include mouse inputs (e.g., click down, click up, and move) and touch inputs (touch down, touch up, and move). As used herein, the terms "click" or "touch" shall refer to type of input or, depending on the context, a click/touch down input that can define a "point" on a displayed image (e.g., a "grid point" on a grid that overlays a displayed image). As used herein, the term "input action" refers to a pattern of one or more inputs detected by an electronic device. An input action may be used to enter a picture password. For example, an input action may include a gesture defined by a pattern of touch inputs. Other examples of input actions include a point action that causes an electronic device to designate a point on a display, and a line action that causes the electronic device to draw a line between a start-point on a display and an end-point on a display. Some specific input actions include a stroke (or stroke action), a drag path (or drag path action), and a click/touch (a click/touch action). As used herein, the term "stroke" shall refer to an input action that includes two points on an image (i.e., two distinct action that includes a path taken between a beginning point of a stroke and an end-point of a stroke.

Returning now to FIG. 2, the client device 12 calculates a hash of the one or more input actions (step 102). The client device can then determine if a part of the hash matches a partial hash where the partial hash is a value derived from an original hash of one or more original input actions or is part of a hash used for authentication of the user (step 104). In some embodiments, this partial hash is obtained by the client device 12 from the PoK server 16. In some embodiments, this determination simply checks that each bit of the partial hash is identical to the corresponding bit in the calculated hash. If the hash matches the partial hash, the client device 12 may then send a communication to the PoK server 16 to authenticate the user based on the one more input actions (step 106). This step is needed to ensure that the input actions actually match the desired input actions and that the match with the partial hash was not just coincidental.

The client device 12 then obtains a response from the PoK server 16 indicating whether the user is authenticated based on the one or more input actions (step 108). Depending on the implementation of the proof of knowledge authentication system 10, the authentication may instead be communicated to the RP server 14.

Figure 3:
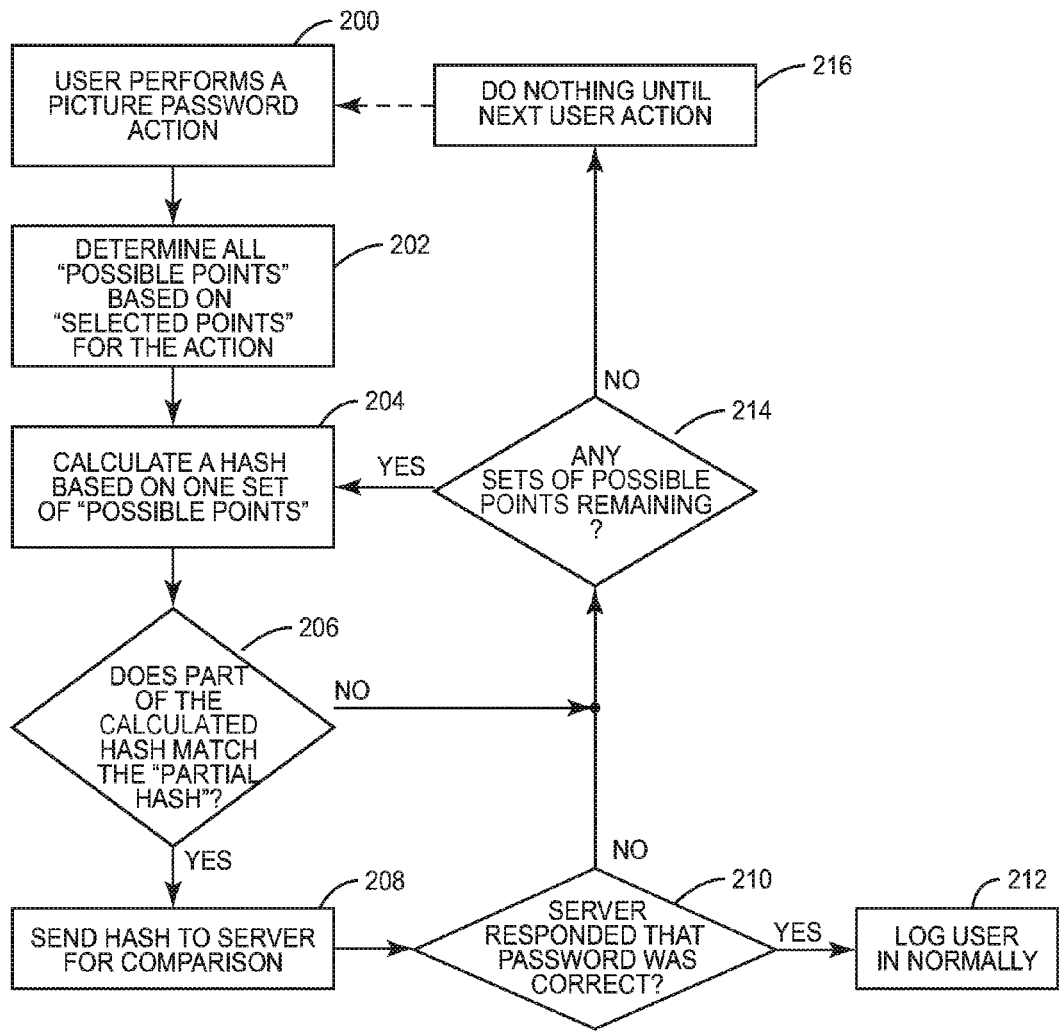
FIG. 3 is a flow chart that illustrates the operation of a client device in the proof of knowledge authentication system during authentication of a user using possible points according to some embodiments of the present disclosure.

When the technique of using the partial hash to filter known incorrect hashes is applied to the embodiments where multiple possible points are considered for the one or more input actions, the reduction of the hashes sent to and processed by the PoK server 16 is even more significant. FIG. 3 is a flow chart that illustrates the operation of a client device 12 in the proof of knowledge authentication system 10 during authentication of a user using possible points according to some embodiments of the present disclosure. A partial hash is a value derived from the original hash and sent by the PoK server 16 to the client device 12 for comparison against hashes computed by the client device 12. "Selected Point(s)" is the point, or points, that make up a single input action performed in a Picture Password such as a click, touch, stroke, or drag path. "Possible Point(s)" consist of the Selected Point(s) and any neighboring points that are to be considered. The neighborhood relation may be fixed or dynamic and may even vary across the image. As shown in FIG. 3, a user performs a Picture Password input action at the client device 12 (step 200). The client device then determines all possible points based on the selected points for the action (step 202). The client device 12 then calculates a hash based on one set of possible points (step 204). As used herein, the phrase "calculate a hash for the sequence of the one or more input actions" is used to describe calculating a hash of one of the possible sequences based on the sequence of the one or more input actions and may also include calculating a hash of the sequence of the one or more input actions.

The client device 12 then determines if part of the calculated hash matches the partial hash (step 206). If the part of the calculated hash matches the partial hash, the client device 12 sends the hash to the PoK server 16 for comparison with the full hash (step 208). If the PoK server 16 responds that the password was correct (step 210) then the user can be logged in normally (step 212). If the PoK server 16 responds that the password was incorrect, the client device 12 determines if there are any additional sets of possible points remaining (step 214). If there are, the client device 12 returns to step 204 to calculate a hash on the new set of possible points. Also, if the client device 12 determines that part of the calculated hash does not match the partial hash, the client device 12 does not send that calculated hash to the PoK server 16 and instead proceeds to step 214 to determine if there are additional sets of possible points remaining to be checked. If there are no unchecked additional sets of possible points and the user has not otherwise been authenticated, the client device 12 does nothing until the next user action (step 216). In some embodiments, this process may be incorporated into a larger process that may include such things as an enforcement of a maximum number of attempts or the ability to detect if the user is making more errors than normally expected.

Figure 4:
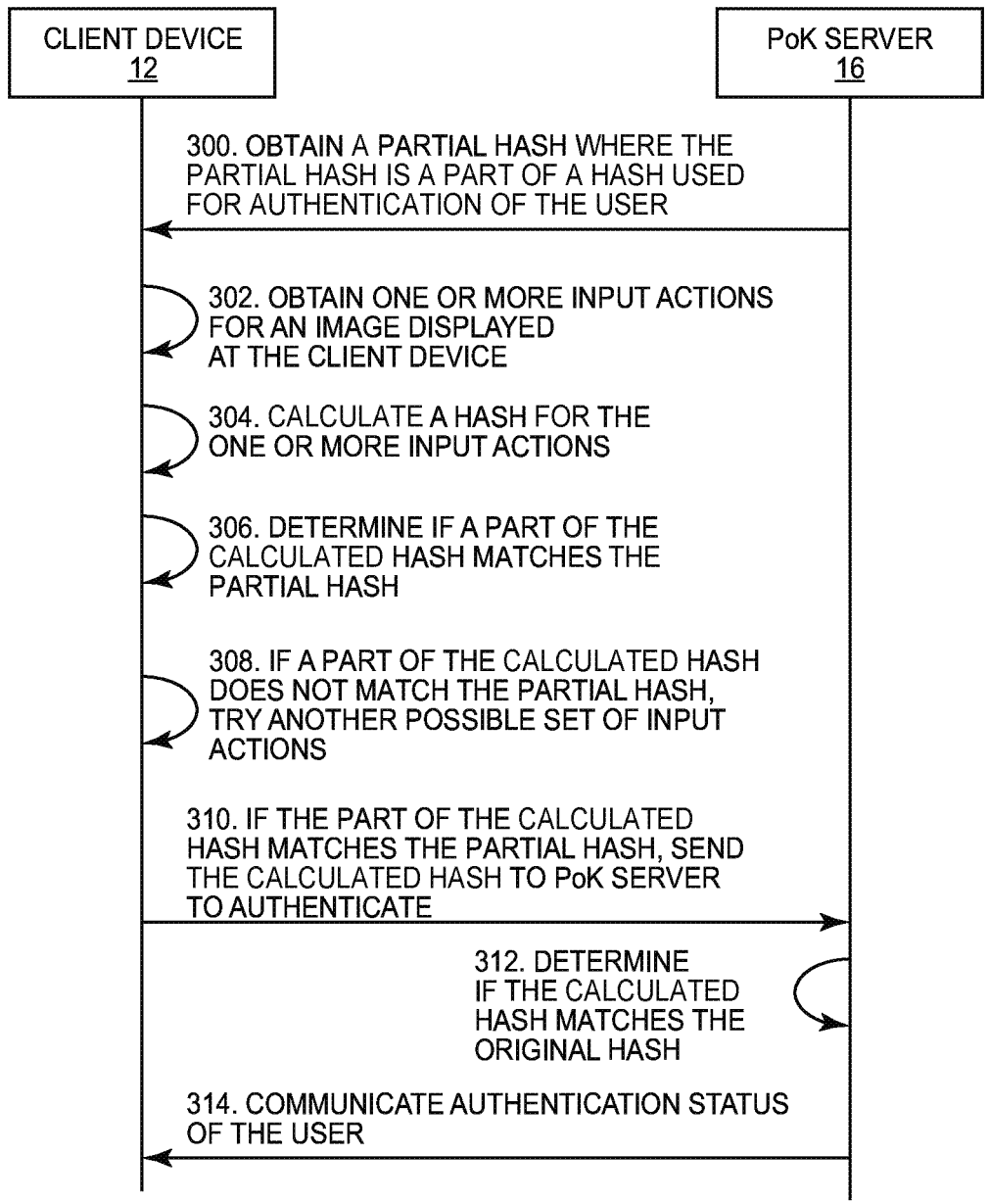
FIG. 4 illustrates the operation of a proof of knowledge authentication system during authentication of a user according to some embodiments of the present disclosure.

FIG. 4 illustrates the operation of a proof of knowledge authentication system 10 during authentication of a user according to some embodiments of the present disclosure. The client device 12 obtains a partial hash from the PoK server 16 where the partial hash is derived from an original hash of one or more original input actions or is part of a hash used for authentication of the user (step 300). Note that while this step is shown before other steps, the timing of when and how the client device 12 obtains the partial hash is implementation dependent. The client device 12 then obtains one or more input actions for an image displayed at the client device 12 (step 302) and calculates a hash for the one or more input actions (step 304). The client device 12 determines if a part of the calculated hash matches the partial hash (step 306). If the part of the calculated hash does not match the partial hash, the client device 12 tries another possible set of input actions (step 308). If the part of the calculated hash matches the partial hatch, the client device 12 sends the full calculated hash to the PoK server 16 to authenticate (step 310). The PoK server 16 then determines if the full calculated hash matches the original hash in some suitable manner (step 312) and communicates authentication status of the user to the client device 12 (step 314).

Figure 5:
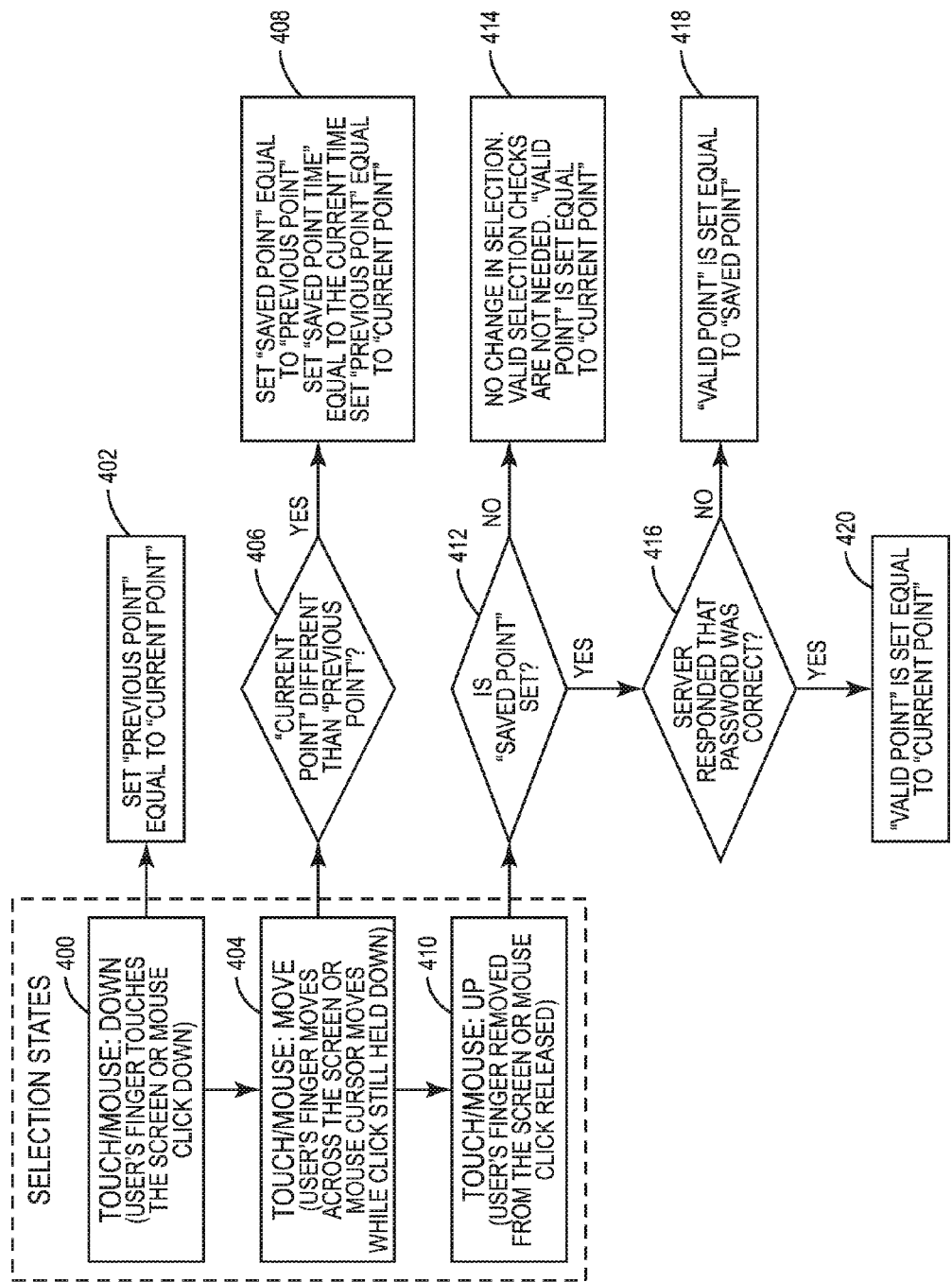
FIG. 5 is a flow chart that illustrates the operation of a client device in the proof of knowledge authentication system to provide antialiasing over time according to some embodiments of the present disclosure.

Another form of antialiasing is antialiasing by time. This is a form of client side hysteresis. Here the problem is that even though a target point is selected, sometimes, due to aliasing induced while a touch is released (or moved as with the beginning of a stroke), the grid location moves to an undesired location. In some situations, this is due to the client device 12 computing a change in the touch point after the user selects it due to the error induced when the touch is released or moved. One way to mitigate this type of error is to keep track of where the touch was a predetermined amount of time prior to the actual release or move so that the action of the release or the action of the move does not alias the result. For example, the predetermined amount of time may be a value such as a quarter of a second for modern devices as they are commonly used. Certain devices and certain software may need longer or shorter hysteresis offsets to maximize the efficacy of the system in achieving this class of antialiasing. One example for providing antialiasing by time is illustrated in FIG. 5 which is a flow chart that illustrates the operation of a client device 12 in the proof of knowledge authentication system 10 to provide antialiasing over time according to some embodiments of the present disclosure. The process begins in the Touch/Mouse: Down state 400. In some embodiments this may be triggered when a user's finger touches the screen or mouse click down on the image. At this point, the client device 12 sets "Previous Point" equal to "Current Point" (step 402). As used herein, "Current Point" is the point that is currently being selected or the final point that was selected. This value is reported by the client device 12. "Previous Point" is the last point selected before the "Current Point" which may be the same as the "Current Point." "Saved Point" is the last point selected that was different than the "Current Point." "Saved Point Time" is the timestamp at which the "Saved Point" was last selected. "Required Selection Time", is the amount of time the "Current Point" must be selected for, to be considered a valid selection. "Valid Point" is the point that's determined to be what the user had intended to select.

Returning now to FIG. 5, it is possible that the next state entered may be the Touch/Mouse: Move state 404. In some embodiments this may be triggered when a user's finger moves across the screen or mouse cursor moves while click still held down. This move may be intentional as part of performing a stroke or drag path or part of choosing the correct touch point. However, this also may be an inadvertent move. As such, the client device 12 checks if the "Current Point" is different than "Previous Point" (step 406). If it is different, the client device 12 sets "Saved Point" equal to "Previous Point"; sets "Saved Point Time" equal to the current time; and sets "Previous Point" equal to "Current Point" (step 408).

The last state that should be entered is the Touch/Mouse: Up state 410 which in some embodiments may be triggered when a user's finger is removed from the screen or mouse click released. This typically indicates the completion of the input action. The client device 12 checks whether "Saved Point" was set (step 412). If no value was set for "Saved Point" then there was no change in selection such that valid selection checks are not needed and "Valid Point" is set equal to "Current Point" (step 414). If a value was set for "Saved Point" then there was a change in selection. The client device 12 determines if "Current Point" meets "Required Selection Time" (step 416). If it does not meet the "Required Selection Time" then the most recent change in selection is treated as an inadvertent change and "Valid Point" is set equal to "Saved Point" (step 418). If it does meet the "Required Selection Time" then the most recent change in selection is treated as an intentional change and "Valid Point" is set equal to "Current Point" (step 420). In some embodiments, the determination if "Current Point" meets "Required Selection Time" in step 416 may be accomplished by defining CT=Current Time, RST=Required Selection Time, and SPT=Saved Point Time. Then, if the following inequality holds, RST has been satisfied:

$$CT > (SPT + RST)$$

In this way, inadvertent changes in the location of a touch or a click may not interfere with the successful performance of the Picture Password. As discussed above, the value for the Required Selection Time may be predetermined based on the type of client device 12 or based on the past experience of the user. In other embodiments the value may be able to be changed dynamically in response to determining that the user is making more errors than normally expected.

Figure 6:
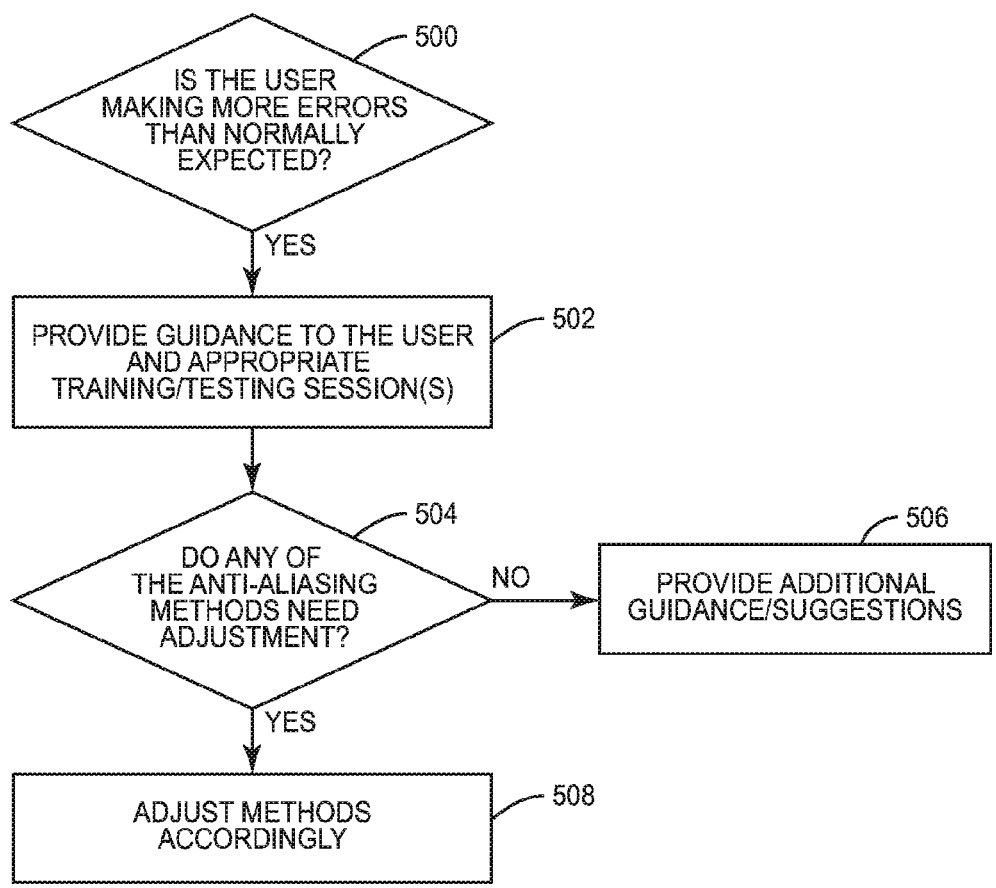
FIG. 6 is a flow chart that illustrates the operation of the proof of knowledge authentication system to detect and address excess authentication mistakes according to some embodiments of the present disclosure.

These antialiasing techniques along with other techniques such as determining an offset may be used to adjust how a user interacts with the proof of knowledge authentication system 10. In some embodiments, there may be some types of guidance or assistance provided to a user. This may be a form of verbal or pictorial guidance for the user or the user may be unaware of the techniques that are employed. One example is to detect if the user is making more errors than would normally be expected (in general, for that user, for that user and that device, for that device, etc.) Then guidance may try to determine if some antialiasing technique(s) need to be adjusted. This may be accomplished by taking the user through an appropriate training session or by changing one or more of the values discussed above. Guidance may also suggest the use of a stylus rather than a finger since a stylus typically provides a finer (smaller) touch point. FIG. 6 is a flow chart that illustrates the operation of the proof of knowledge authentication system 10 to detect and address excess authentication mistakes according to some embodiments of the present disclosure. The guidance may be first initiated based on either the client device 12 or the PoK server 16 determining that the user is making more errors than normally expected (step 500). This may be based on the type of mistakes the user is making and/or on the amount of mistakes being made. This step may also include determining if this is a different client device 12 or different type of device than the user typically uses. The user may then be provided with guidance and appropriate training/testing session(s) (step 502). As discussed above, this may include suggesting that the user use a stylus for more precise input. This step may also include a training session where a user is prompted to perform a specific input action. The results of the input action may inform the user about errors or misperceptions that are being made. The results may also be used to determine if any system parameters should be adjusted. For instance, it may be determined if any of the antialiasing methods need adjusted (step 504). If it is determined that no adjustments are necessary, additional guidance and/or suggestions may be provided to the user (step 506). If adjustments are determined to be necessary or desirable, the methods may be adjusted accordingly (step 508). For example, if it is determined that the user's input location is moving just prior to the selection of an input, then it may be determined to adjust the "Required Selection Time" for antialiasing by time as discussed in relation to FIG. 5 above. Or, it may be determined that the user's finger is occluding the input location and therefore an offset value should be determined or adjusted. Other values could also be adjusted depending on the implementation of the proof of knowledge authentication system 10.

Figure 7:
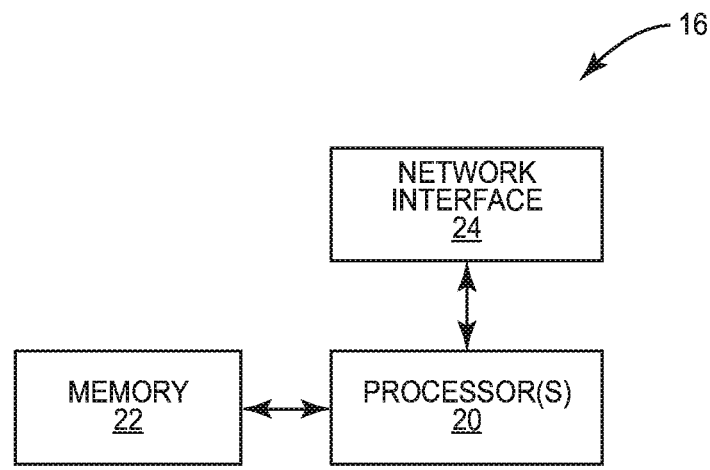
FIG. 7 is a block diagram of a proof of knowledge server for providing a proof of knowledge service according to some embodiments of the present disclosure.

FIG. 7 is a block diagram of a PoK server 16 for providing a proof of knowledge service according to some embodiments of the present disclosure. As illustrated, the PoK server 16 includes one or more processors 20 such as, for example, one or more Central Processing Units (CPUs), Application Specific Integrated Circuits (ASICs), and/or Field Programmable Gate Arrays (FPGAs), memory 22, and a network interface 24. In some embodiments, the functionality of the PoK server 16 is implemented in software stored in the memory 22 for execution by the one or more processors 20. In some embodiments, the PoK server 16 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the PoK server 16 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 22).

Figure 8:
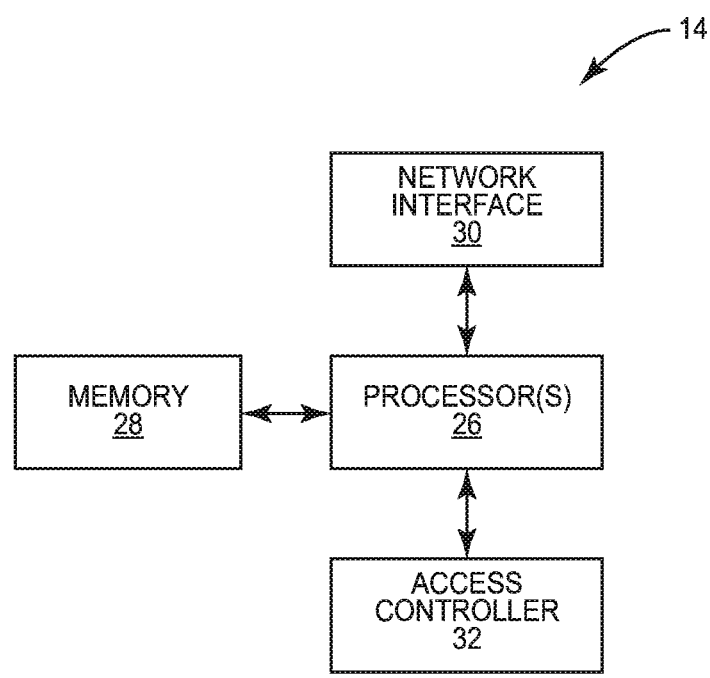
FIG. 8 is a block diagram of a relying party server according to some embodiments of the present disclosure.

FIG. 8 is a block diagram of a RP server 14 according to some embodiments of the present disclosure. As illustrated, the RP server 14 includes one or more processors 26 such as, for example, one or more CPUs, ASICs, and/or FPGAs, memory 28, and a network interface 30. The RP server 14 also includes an access controller 32 to control access to services administered by the RP server 14 in accordance with advanced directive(s). As illustrated, the access controller 32 may be embodied in, for example, one or more ASICs, FPGAs, or any combination of hardware and/or software components. In some embodiments, the functionality of the RP server 14 is implemented in software stored in the memory 28 for execution by the one or more processors 26. In some embodiments, the RP server 14 may include additional components responsible for providing additional functionality, including any of the functionality identified above and/or any functionality necessary to support the solutions described above.

In some embodiments, a computer program including instructions which, when executed by at least one processor, cause the at least one processor to carry out the functionality of the RP server 14 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 28).

Figure 9:
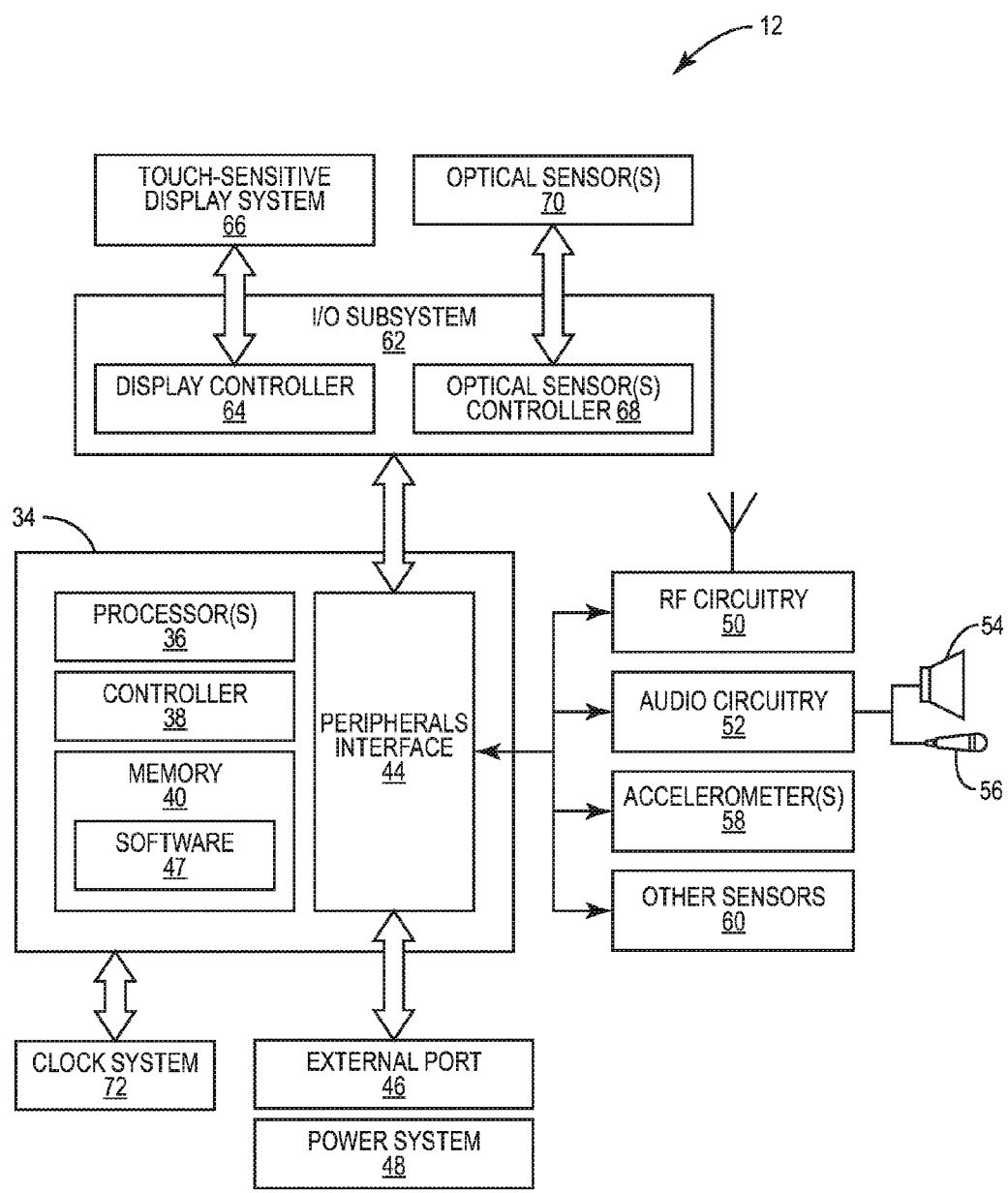
FIG. 9 is a block diagram of a client device according to some embodiments of the present disclosure.

FIG. 9 is a block diagram of a client device 12 according to some embodiments of the present disclosure. The client device 12 is shown as an electronic device with a touch-sensitive display (e.g., a smartphone) but may be embodied as any other type of client device. As shown, client device 12 includes a control or processing system 34 that includes one or more processors 36 (e.g., CPUs, ASICs, and/or FPGAs), a memory controller 38, memory 40 (which may include software 42 such as a browser software application), and a peripherals interface 44.

The peripherals interface 44 may communicate with an external port 46, which can provide access to a power system 48. Other components in communication with the peripherals interface 44 include Radio Frequency (RF) circuitry 50 (e.g., WiFi and/or cellular communications circuitry) and audio circuitry 52 for speaker 54 and microphone 56 of the client device 12. Other components in communication with the peripherals interface 44 include the one or more accelerometers 58 and other sensors 60. The peripherals interface 44 may communicate with an Input/Output (I/O) subsystem 62, which includes a display controller 64 operable to control a touch-sensitive display system 66, which further includes the touch-sensitive display of the client device 12. The I/O subsystem 62 includes an optical sensor(s) controller 68 for one or more optical sensors 70. Lastly, a clock system 72 controls a timer for use by the disclosed embodiments as detailed above.

Accordingly, FIG. 9 shows components of the client device 12 that enable a user to interface with features of the disclosed embodiments. The client device 12 may include other components not shown in FIG. 9, nor further discussed herein for the sake of brevity. A person skilled in the art will FIG. 9. For example, the I/O subsystem 62 may include other components (not shown) to control physical buttons.

In some embodiments, a computer program including instructions which, when executed by at least one processor, cause the at least one processor to carry out the functionality of the client device 12 according to any one of the embodiments described herein as provided. In some embodiments, a carrier containing the aforementioned computer program product is provided. The carrier is one of an electronic signal, an optical signal, a radio signal, or a computer readable storage medium (e.g., a non-transitory computer readable medium such as the memory 40).

Those skilled in the art will recognize improvements and modifications to the preferred embodiments of the present disclosure. All such improvements and modifications are considered within the scope of the concepts disclosed herein and the claims that follow.

What is claimed is:

1. A client device for authenticating a user, comprising:
one or more processors; and
memory containing instructions executable by the one or more processors whereby the client device is operable to:
    obtain a first sequence of one or more input actions associated with an image displayed at the client device;
    obtain a partial hash from a proof of knowledge server where a hash used for authentication of the user is n bits, the partial hash is k bits of the hash used for authentication of the user, and k is less than n;
    calculate a hash for a second sequence of one or more input actions, wherein the second sequence of the one or more input actions is based on the first sequence of the one or more input actions;
    determine if a part of the calculated hash matches the partial hash;
    in response to determining that the part of the calculated hash matches the partial hash, send a communication to the proof of knowledge server to authenticate the user based on the calculated hash for the second sequence of the one or more input actions;
    obtain a response from the proof of knowledge server based on the calculated hash for the second sequence of the one or more input actions; and
    based on the response from the proof of knowledge server based on the calculated hash for the second sequence of the one or more input actions, permit or deny access.

2. The client device of claim 1 wherein the second sequence of the one or more input actions is the first sequence of the one or more input actions.

3. The client device of claim 2 further operable to:
calculate a hash of a third sequence of one or more input actions, wherein the third sequence of the one or more input actions is based on the first sequence of the one or more input actions, and the third sequence of the one or more input actions is different from the second sequence of the one or more input actions;
determine if the part of the calculated hash matches the partial hash;
in response to determining that the part of the calculated hash matches the partial hash, send a communication to the proof of knowledge server to authenticate the user based on the calculated hash of the third sequence of the one or more input actions; and
obtain a response from the proof of knowledge server based on the calculated hash of the third sequence of one or more input actions.

4. The client device of claim 3 further operable to:
for each of a plurality of possible additional sequences of one or more input actions based on the first sequence of the one or more input actions, perform the calculate, determine, send, and obtain steps for that possible additional sequence.

5. The client device of claim 2 wherein being operable to obtain the one or more input actions comprises being operable to:
    tile the image with an implicit grid comprising a plurality of grid elements; and
    obtain the one or more input actions according to the implicit grid.

6. The client device of claim 4 further operable to:
    for each input action of the first sequence of the one or more input actions, determine one or more possible input actions; and
    determine the plurality of possible additional sequences of the one or more input actions as the combination of one of the one or more possible input actions.

7. The client device of claim 6 wherein being operable to determine the one or more possible input actions for the input action of the first sequence comprises being operable to determine the one or more possible input actions for the input action of the first sequence using neighboring points of the input action of the first sequence.

8. The client device of claim 7 wherein the neighboring points of the input action of the first sequence are neighboring points of the input action of the first sequence on the implicit grid.

9. The client device of claim 8 wherein the implicit grid is hexagonal and each input action of the first sequence has six neighboring points comprising the vertices of a hexagon on the implicit grid centered at the input action.

10. The client device of claim 1 wherein the partial hash is the first k bits of the n-bit hash used for authentication of the user.

11. A system comprising:
a client device for authenticating a user and a proof of knowledge server, the client device comprising:
    one or more processors; and
    memory containing instructions executable by the one or more processors whereby the client device is operable to:
        obtain a first sequence of one or more input actions associated with an image displayed at the client device;
        obtain a partial hash from the proof of knowledge server where a hash used for authentication of the user is n bits, the partial hash is k bits of the hash used for authentication of the user, and k is less than n;
        calculate a hash for a second sequence of one or more input actions, wherein the second sequence of the one or more input actions is based on the first sequence of the one or more input actions;
        determine if a part of the calculated hash matches the partial hash;
        in response to determining that the part of the calculated hash matches the partial hash, send a communication to a proof of knowledge server to authenticate the user based on the calculated hash for the second sequence of the one or more input actions;
        obtain a response from the proof of knowledge server based on the calculated hash for the second sequence of the one or more input actions; and based on the response from the proof of knowledge server based on the calculated hash for the second sequence of the one or more input actions, permit or deny access; and the proof of knowledge server comprising:
one or more processors; and
memory containing instructions executable by the one or more processors whereby the proof of knowledge server is operable to:
send a communication to a client device containing a partial hash where the partial hash is a value derived from an original hash of an original sequence of one or more original input actions used to authenticate a user;
receive a communication from a client device containing a calculated hash for the second sequence of one or more input actions; and
send a response based on the calculated hash for the second sequence of the one or more input actions.

12. The proof of knowledge server of claim 11 wherein sending a response based on the hash for the second sequence of the one or more input actions comprises:
determine if the hash received from the client device and the original hash are the same;
if the hash received from the client device and the original hash are the same, send a communication to the client device, wherein the communication contains an indication that the user at the client device is authenticated; and
if the hash received from the client device and the original hash are not the same, send a communication to the client device, wherein the communication contains an indication that the user at the client device is not authenticated.

13. The client device of claim 11 wherein the partial hash is the first k bits of the original hash.

* * * * *